(12) United States Patent
Sekiguchi

(10) Patent No.: US 9,425,899 B2
(45) Date of Patent: Aug. 23, 2016

(54) OPTICAL TRANSMITTER AND METHOD FOR CONTROLLING OPERATION STATE OF OPTICAL TRANSMITTER

(71) Applicant: FUJITSU LIMITED, Kawasaki-shi, Kanagawa (JP)

(72) Inventor: Shigeaki Sekiguchi, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/329,529

(22) Filed: Jul. 11, 2014

(65) Prior Publication Data

US 2014/0321848 A1 Oct. 30, 2014

Related U.S. Application Data

(63) Continuation of application No. PCT/JP2012/052188, filed on Jan. 31, 2012.

(51) Int. Cl.
*H04B 10/08* (2006.01)
*H04B 10/564* (2013.01)
*H04B 10/516* (2013.01)
*G02F 1/01* (2006.01)
*G02F 1/025* (2006.01)

(52) U.S. Cl.
CPC ............ *H04B 10/564* (2013.01); *G02F 1/0123* (2013.01); *G02F 1/025* (2013.01); *H04B 10/516* (2013.01); *G02F 2203/055* (2013.01); *G02F 2203/15* (2013.01); *G02F 2203/21* (2013.01)

(58) Field of Classification Search
CPC ............................. H04B 10/564; H04B 10/516
See application file for complete search history.

(56) References Cited

U.S. PATENT DOCUMENTS

| | | | |
|---|---|---|---|
| 2004/0081386 A1* | 4/2004 | Morse | G02B 6/12007 385/15 |
| 2009/0046748 A1* | 2/2009 | Kato | H01S 5/026 372/20 |
| 2009/0226129 A1* | 9/2009 | Kuipers | G02F 1/3132 385/14 |
| 2009/0274187 A1* | 11/2009 | Kudo | H01S 5/026 372/49.01 |
| 2012/0207479 A1* | 8/2012 | Krishnamoorthy | H04B 10/506 398/85 |

FOREIGN PATENT DOCUMENTS

| | | |
|---|---|---|
| JP | 62-100706 A | 5/1987 |
| JP | 2010-27664 A | 2/2010 |

OTHER PUBLICATIONS

Notification of Transmittal of Translation of The International Preliminary Report on Patentability (Form PCT/IB/338, PCT/IB/373 & Form PCT/ISA/237), PCT/JP2012/052188, 8 pages, dated Aug. 14, 2014.

International Search Report, mailed in connection with PCT/JP2012/052188 and mailed Feb. 28, 2012.

(Continued)

*Primary Examiner* — Dzung Tran
(74) *Attorney, Agent, or Firm* — Fujitsu Patent Center

(57) ABSTRACT

An optical transmitter includes: a ring waveguide; an electrode which is formed near the ring waveguide and is provided with a signal; a first waveguide optically coupled to the ring waveguide; a second waveguide optically coupled to the ring waveguide without optically coupled directly to the first waveguide; and a light source configured to supply continuous wave light to the first waveguide.

11 Claims, 15 Drawing Sheets

(56) References Cited

OTHER PUBLICATIONS

Yunchu Li et al, "Enhanced Performance and Flexibility in Silicon Modulators Based on a Coupled-Ring-Resonator Structure", Conference on Optical Fiber communication/National Fiber Optic Engineers Conference, 2008. (OFC/NFOEC 2008), Feb. 24, 2008, JThA35.

Po Dong et al, "Low Vpp, Ultralow-Energy, Compact, High-Speed Silicon Electro-Optic Modulator", Optics Express, Dec. 7, 2009, vol. 17, No. 25, p. 22484-22490.

Xuezhe Zheng et al, "Ultra-Low Power Arrayed CMOS Silicon Photonic Transceivers for an 80Gbps WDM Optical Link", Optical Fiber Communication Conference and Exposition (OFC/NFOEC), 2011 and the National Fiber Optic Engineers Conference, Mar. 6, 2011, PDPA1.

JPOA—Office Action issued for corresponding Japanese Patent Application No. 2013-556132, dated Apr. 7, 2015, with partial English translation.

CNOA—The First Office Action of Chinese Patent Application No. 201280067734.0 dated Mar. 22, 2016, with English translation.

* cited by examiner

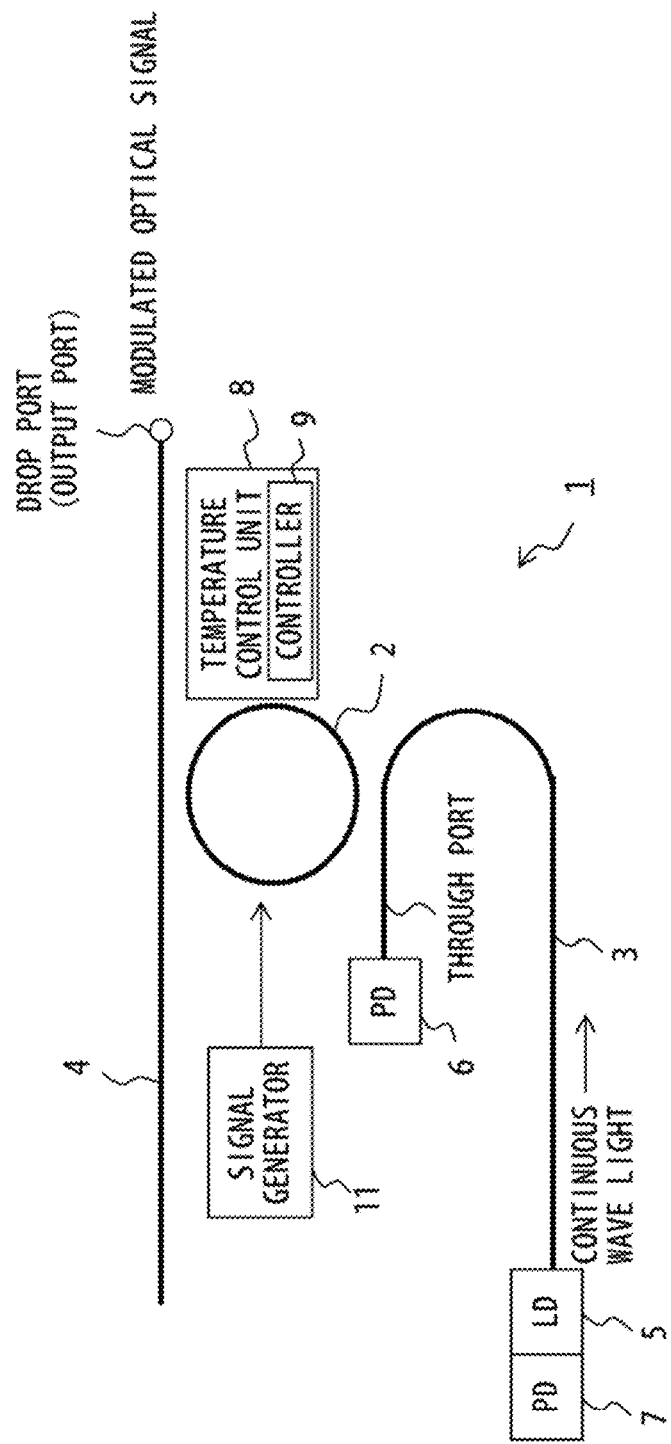
F I G. 2

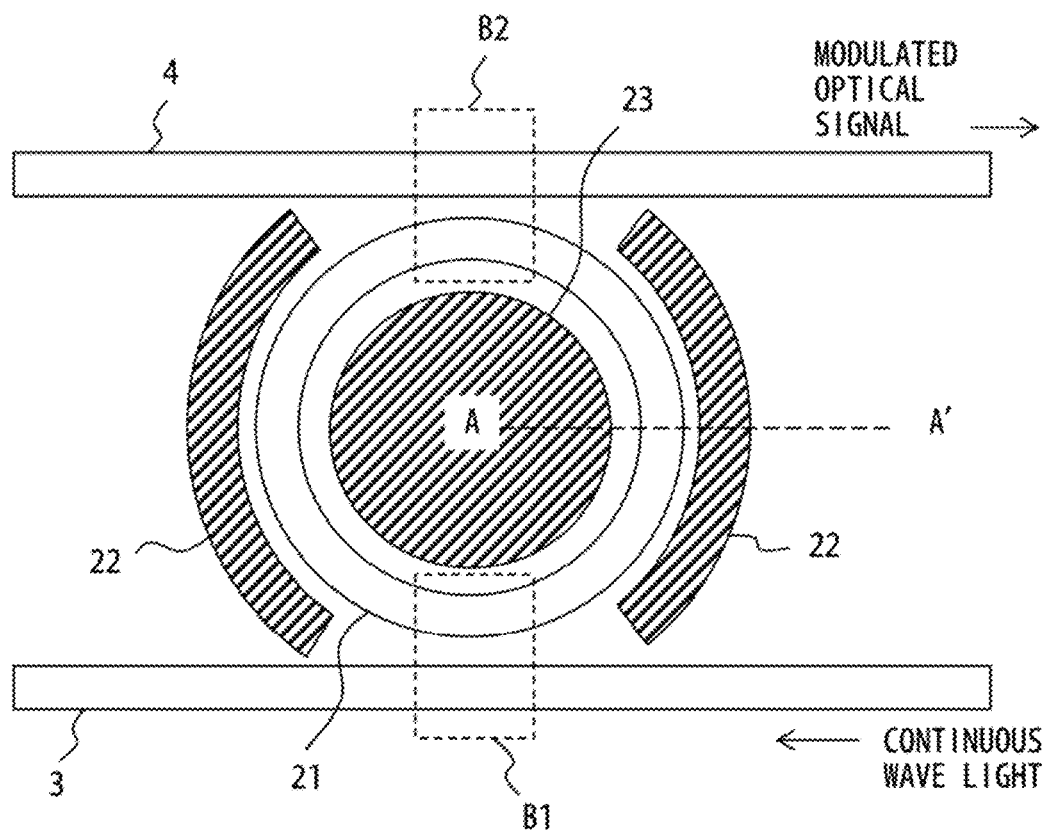
F I G. 4A
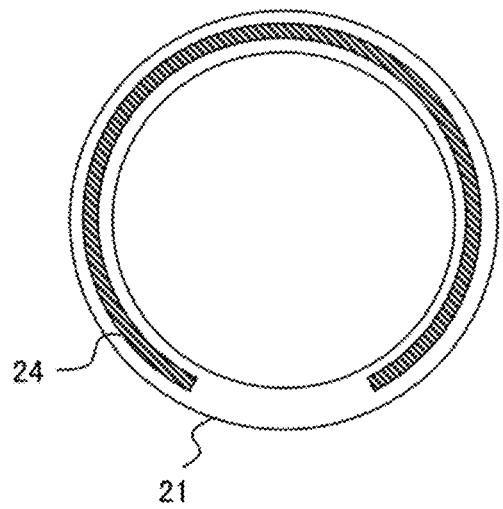
F I G. 4B

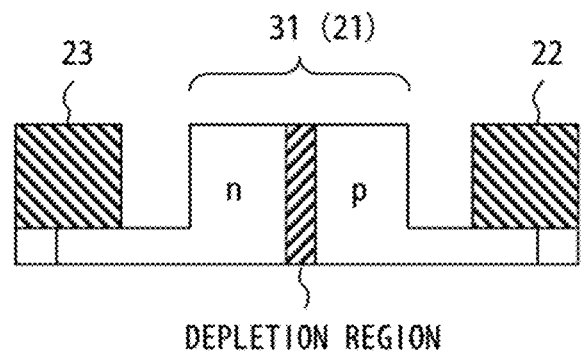
F I G. 6 A
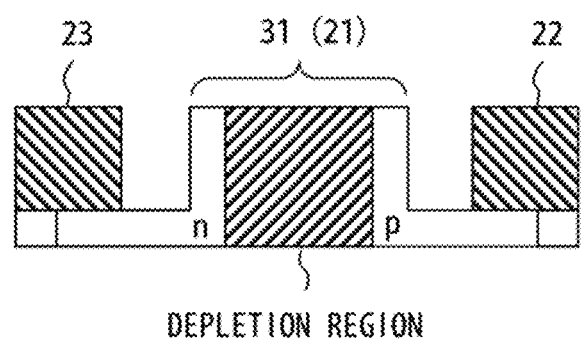
F I G. 6 B

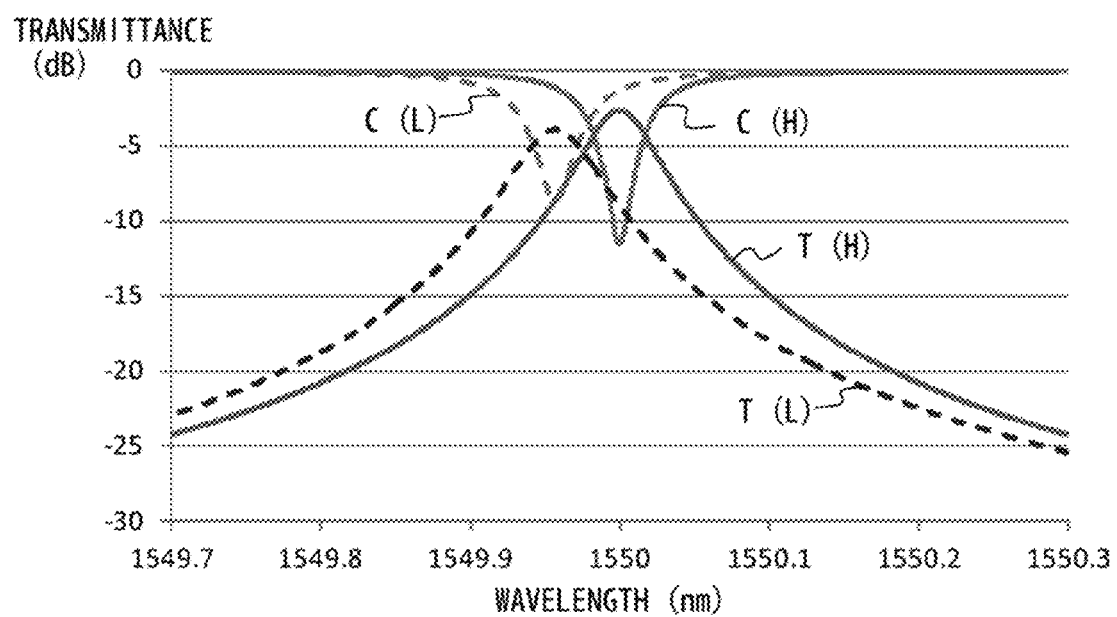
F I G. 7

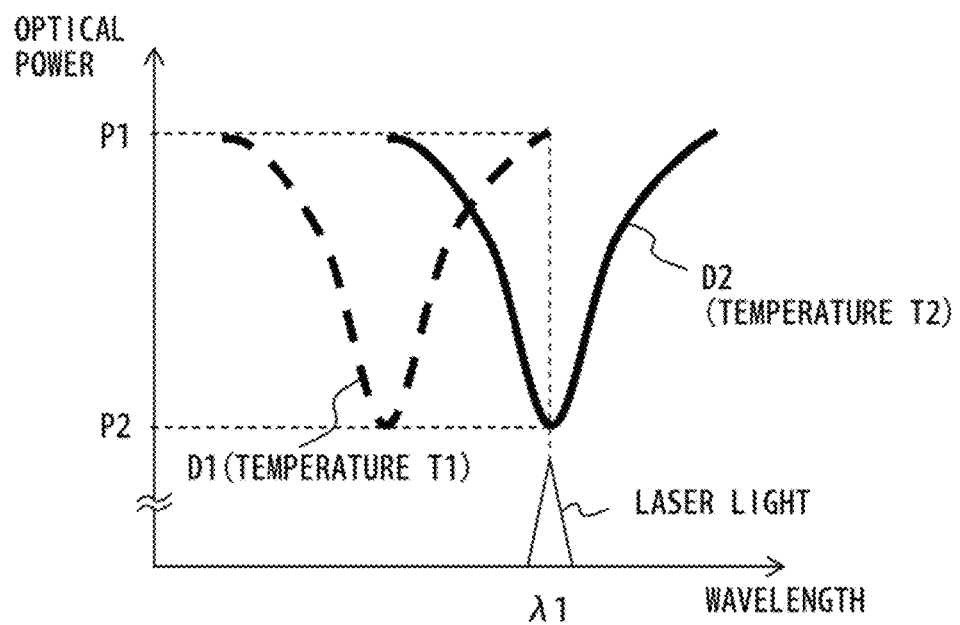
F I G. 10

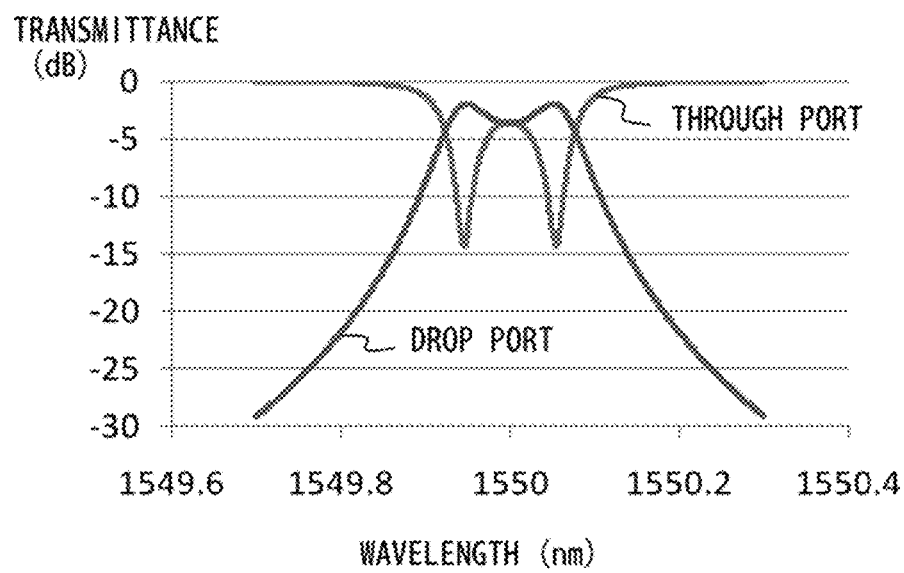
F I G. 1 3 A
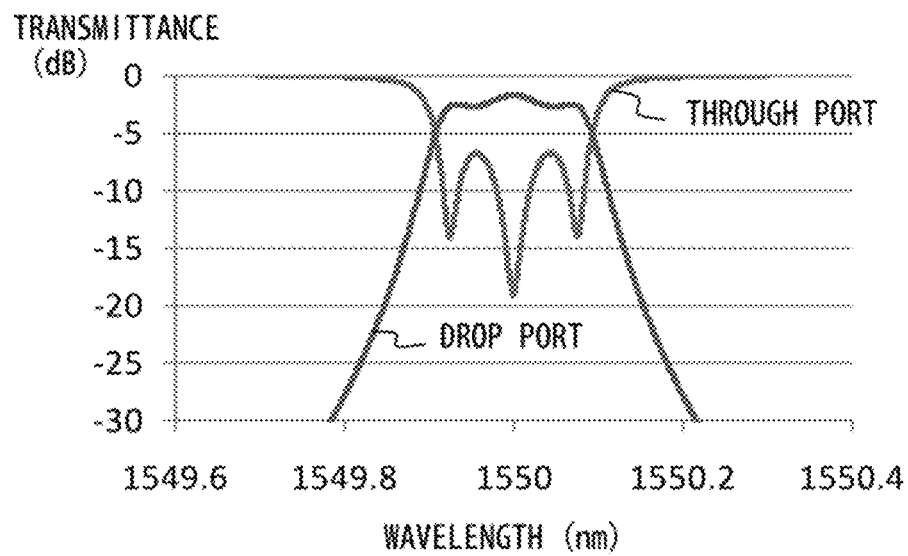
F I G. 1 3 B

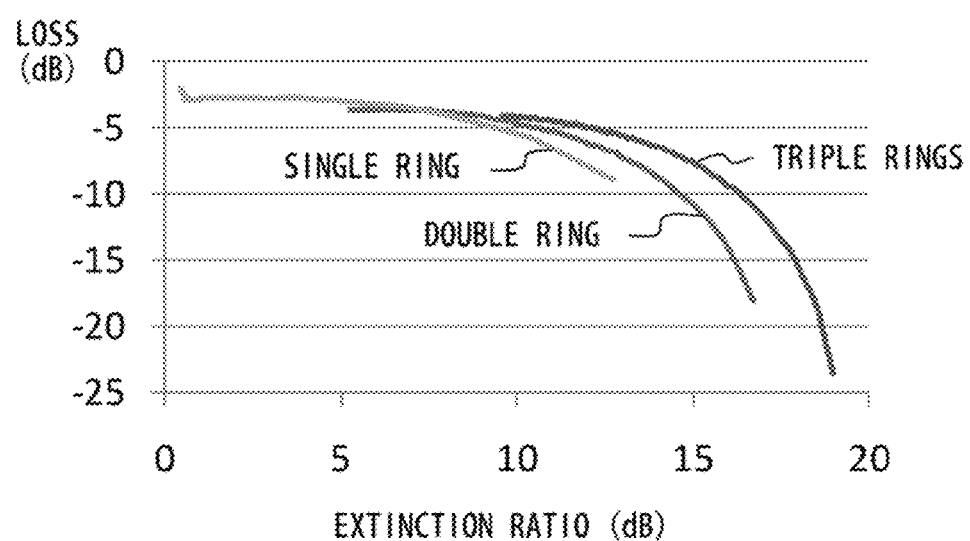
F I G. 1 4

OPTICAL TRANSMITTER AND METHOD FOR CONTROLLING OPERATION STATE OF OPTICAL TRANSMITTER

CROSS-REFERENCE TO RELATED APPLICATION

This application is a continuation application of International Application PCT/JP2012/052188 filed on Jan. 31, 2012 and designated the U.S., the entire contents of which are incorporated herein by reference.

FIELD

The embodiments discussed herein are related to an optical transmitter and a method for controlling an operation state of the optical transmitter.

BACKGROUND

Recently, the technology of forming an optical device using a semiconductor platform has been developed. For example, a silicon platform optical device of a silicon material has been studied and developed.

In the field of a semiconductor device, an advanced and inexpensive micromachining technology has been realized. By applying this technology to optical components, an inexpensive and small optical device (for example, an optical transmitter, an optical modulator) may be produced. Therefore, a semiconductor platform optical device is considered as an important device in the optical communication over an optical network, an optical interconnection, etc.

FIG. 1 illustrates an example of an optical modulator formed on a semiconductor platform. This optical modulator is an all-pass ring resonator optical modulator, and includes a bus waveguide 101, a ring resonator 102, and an electrode 103. The bus waveguide 101 and the ring resonator 102 are optical waveguides formed on a semiconductor platform. The bus waveguide 101 and the ring resonator 102 are optically coupled to each other. The ring resonator 102 is formed between a pair of electrodes 103, as illustrated in FIG. 1.

In the optical modulator with the above-mentioned configuration, continuous wave light of a specified wavelength is input to the bus waveguide 101. A portion of the continuous wave light is guided to the ring resonator 102. The continuous wave light guided to the ring resonator 102 is propagated counterclockwise, and then output to the bus waveguide 101 in the example illustrated in FIG. 1. The perimeter of the ring resonator 102 is determined to have a specified relationship with the wavelength of the continuous wave light. A data signal is applied to the electrode 103. By so doing, the optical path length of the ring resonator 102 is changed depending on the data signal. Therefore, the optical modulator can generate a modulated optical signal which carries the data signal.

Since the optical modulator with the above-mentioned configuration uses a resonance effect, the power consumption is low. In addition, it is easy to downsize this optical modulator, for example, 10 μm×10 μm in size. However, it is necessary that the operating wavelength which depends on the perimeter of the ring resonator 102 matches the wavelength of incoming light with very high accuracy.

Furthermore proposed is an optical transmitter having a plurality of ring modulator (For example, Xuezhe Zheng et. al., Ultra-Low Power Arrayed CMOS Silicon Photonic Transceivers for an 80 Gbps WDM Optical Link, National Fiber Optic Engineers Conference, Optical Society of America, 2011, PDPA1). In the optical transmitter, each ring modulator is realized by, for example, the optical modulator illustrated in FIG. 1. The plurality of ring modulators are optically coupled to a common bus waveguide. According to the configuration, a wavelength division multiplexing optical transmitter is realized. However, in the configuration, it is necessary that the wavelength of each channel of input light matches corresponding operating wavelength of each ring modulator with high accuracy. Therefore, in the optical transmitter, the control for obtaining an appropriate operation state is complicated. If the operating wavelength of the ring modulator is inappropriately adjusted in the above-mentioned optical transmitter, then, for example, a data signal to be transmitted using a certain wavelength channel may be assigned to another wavelength channel.

Further proposed is an optical integrated device (for example, Japanese Laid-open Patent Publication No. 2010-27664) including a semiconductor laser and an optical modulator (resonator-based optical modulator) coupled to the semiconductor laser. This optical integrated device includes a waveguide wavelength filter for extracting only the light (modulated light) in an oscillation mode included in the resonant wavelength band of the optical modulator. The wavelength filter is a ring resonator-based wavelength filter. However, in the configuration, it is necessary to perform complicated control to match the operating wavelength of the ring resonator which realizes an optical modulator and the operating wavelength of the ring resonator which realizes a wavelength filter with the signal wavelength.

The technology of forming an optical device on a semiconductor platform is also described in, for example, Po Dong et. al., Low Vpp, ultralow-energy, compact, high-speed silicon electro-optic modulator, Opt. Express, OSA, 2009 Vol. 17, No. 25, 22484-22490.

As described above, in the related art, the control for correctly operating an optical transmitter or an optical modulator having a ring resonator is complicated.

SUMMARY

According to an aspect of the embodiments, an optical transmitter includes: a ring waveguide; an electrode which is formed near the ring waveguide and is provided with a signal; a first waveguide optically coupled to the ring waveguide; a second waveguide optically coupled to the ring waveguide without optically coupled directly to the first waveguide; and a light source configured to supply continuous wave light to the first waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration of an optical transmitter according to an embodiment of the present invention;

FIGS. 4A and 4B illustrate a ring resonator-based modulator and its vicinities viewed from above;

FIGS. 6A and 6B are explanatory views of the depletion region of a waveguide core region;

FIG. 7 illustrates the transmittance of the ring resonator-based modulator;

FIG. 10 is an explanatory view of the control of the temperature in step S2 in FIG. 9;

FIGS. 13A and 13B illustrate the transmission spectrum of the ring resonator-based modulator illustrated in FIGS. 12A and 12B; and FIG. 14 illustrates the relationship between the extinction ratio and the insertion loss of the ring resonator-based modulator.

DESCRIPTION OF EMBODIMENTS

Figure 1:
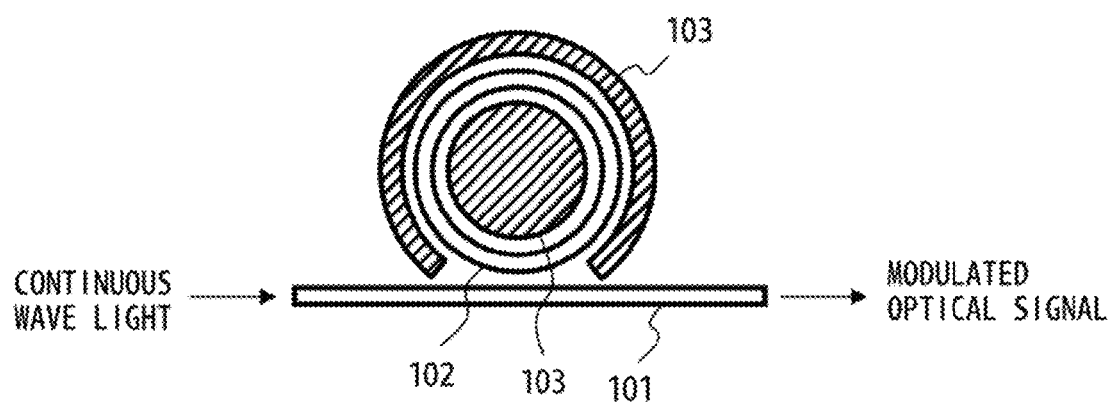
FIG. 1 illustrates an example of an optical modulator formed on a semiconductor platform.

FIG. 2 illustrates a configuration of an optical transmitter according to an embodiment of the present invention. An optical transmitter 1 according to the embodiment includes a ring resonator-based modulator 2, an input waveguide 3, an output waveguide 4, and a light source (LD) 5.

The ring resonator-based modulator 2, that will be described later in detail, includes a ring waveguide and an electrode formed near the ring waveguide. The input waveguide 3 is optically coupled to the ring waveguide of the ring resonator-based modulator 2. The output waveguide 4 is also optically coupled to the ring waveguide of the ring resonator-based modulator 2. However, the input waveguide 3 and the output waveguide 4 are not optically coupled directly to each other.

An optical modulator may be realized using the ring resonator-based modulator 2, the input waveguide 3, and the output waveguide 4 illustrated in FIG. 2. In this case, the optical modulator, for example, modulates the continuous wave light generated by the light source 5 by a data signal, thereby generating a modulated optical signal.

Figure 3:
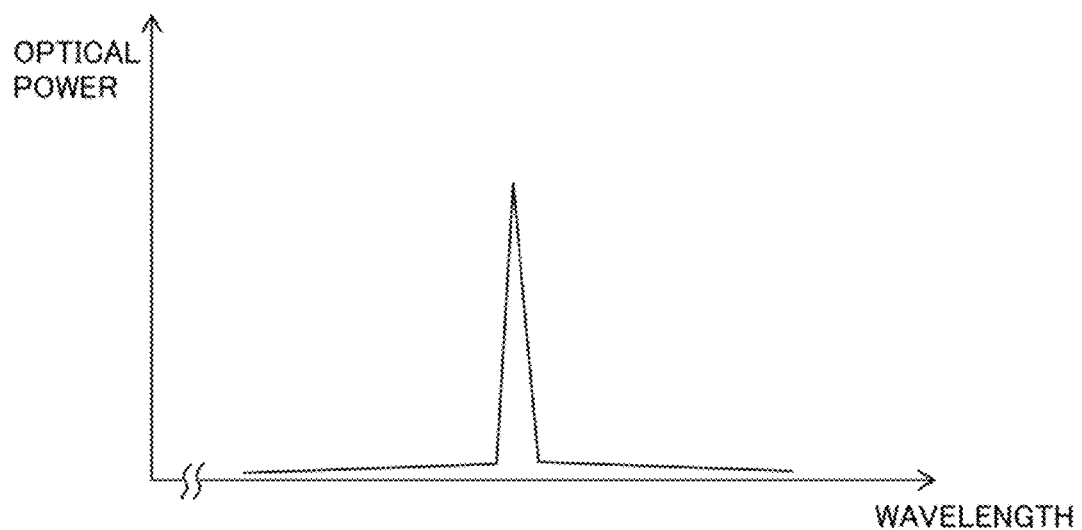
FIG. 3 illustrates an example of the spectrum of the continuous wave light generated by a light source.

The light source 5 is a laser and provides continuous wave light for the input waveguide 3. The light source 5 is not specifically restricted, but is assumed to have a plurality of oscillation modes in this example. In this case, the spectrum of the continuous wave light output from the light source 5 has a single peak with respect to one oscillation mode as illustrated in FIG. 3.

A signal generator 11 generates a drive signal for driving the ring resonator-based modulator 2. The drive signal is generated based on, for example, the data signal transmitted by the optical transmitter 1. The drive signal is a voltage signal including an H level and an L level in the present embodiment. The drive signal is applied to the electrode of the ring resonator-based modulator 2. The signal generator 11 may be a part of the optical transmitter 1, and may be provided externally to the optical transmitter 1.

The optical transmitter 1 further includes photodetectors (PD) 6 and 7. The photodetector 6 is provided at one end of the input waveguide 3. The light source 5 is provided at the other end of the input waveguide 3. That is, the photodetector 6 is provided at the opposite end of the input waveguide 3 with respect to the light source 5. In the description below, the end of the input waveguide 3 at which the photodetector 6 is provided may be referred to as a "through port".

The photodetector 6 detects the optical level of the through port. That is, the photodetector 6 detects the power of the light guided to the through port passing through the input waveguide 3. The photodetector 7 detects the output level of the light source 5. That is, the photodetector 7 detects the output power of the light source 5.

The optical transmitter 1 further includes a temperature control unit 8. The temperature control unit 8 controls the temperature of the ring waveguide of the ring resonator-based modulator 2. The optical path length of the optical waveguide is changed depending on the temperature. That is, the temperature control unit 8 may adjust the optical path length of the ring waveguide of the ring resonator-based modulator 2.

The temperature control unit 8 includes a heater electrode (resistor) formed near the ring waveguide of the ring resonator-based modulator 2, and a controller 9 for controlling the current to be supplied to the heater electrode. The controller 9 controls the current to be supplied to the heater electrode based on the optical level detected by the photodetectors 6 and 7. Otherwise, the controller 9 may control the current to be supplied to the heater electrode based on the optical level detected by the photodetector 6. Furthermore, the controller 9 may control a signal generator 11 so that a specified drive signal may be generated. For example, the controller 9 may control the signal generator 11 so that the drive signal may continuously indicate the H level (or continuously indicate the L level). The controller 9 is not specifically restricted, but is realized by, for example, a processor and memory.

In the optical transmitter 1 with the above-mentioned configuration, the light source 5 supplies continuous wave light to the input waveguide 3. The input waveguide 3 is optically coupled to the ring waveguide of the ring resonator-based modulator 2. Therefore, a portion of the continuous wave light which is propagated through the input waveguide 3 is guided to the ring resonator-based modulator 2. Thus, the continuous wave light which is guided to the ring resonator-based modulator 2 is propagated through the ring waveguide. The continuous wave light is propagated through the ring waveguide clockwise in the example illustrated in FIG. 2.

The drive signal is provided for the ring resonator-based modulator 2 from the signal generator 11. The ring resonator-based modulator 2 generates a modulated optical signal by modulating the continuous wave light which is propagated through the ring waveguide by the drive signal. The output waveguide 4 is optically coupled to the ring waveguide of the ring resonator-based modulator 2. Therefore, the modulated optical signal generated by the ring resonator-based modulator 2 is guided to the output waveguide 4. The modulated optical signal is output through a drop port (that is, an output port).

In the ring resonator-based modulator 2, the wavelength component corresponding to the optical path length of the ring waveguide (that is, the optical perimeter of the ring waveguide) becomes resonant, and other wavelength components are substantially cancelled. That is, only the optical signal of the wavelength component corresponding to the optical path length of the ring waveguide is guided to the output waveguide 4 from the ring resonator-based modulator 2. Therefore, the ring resonator-based modulator 2 operates as an optical modulator and also as a wavelength filter which passes only a specified wavelength component.

FIGS. 4A and 4B illustrate the ring resonator-based modulator and its vicinities viewed from above. However, for higher visibility of the figure, the resistor used as a heater electrode is omitted in FIG. 4A.

The ring resonator-based modulator 2 includes a ring waveguide 21 and electrodes 22 and 23 as illustrated in FIG.

4A. In this example, a shape of the ring waveguide 21 is circle. The optical path length of the ring waveguide 21 determines the resonance wavelength. That is, the passing wavelength of a wavelength filter depends on the optical path length of the ring waveguide 21. Although not specifically restricted in the present embodiment, the curvature of the radius of the ring waveguide 21 may be approximately 8 µm.

The electrodes 22 and 23 are formed in such a way that the ring waveguide 21 is provided between the electrodes 22 and 23. In this example, the electrode 22 is formed outside the ring waveguide 21, and the electrode 23 is formed inside the ring waveguide 21. The electrodes 22 and 23 are provided with a drive signal generated by the signal generator 11. The drive signal is a voltage signal including the H level and the L level as described above. Therefore, when the drive signal indicates the H level, a voltage of the H level is applied between the electrodes 22 and 23. When the drive signal indicates the L level, a voltage of the L level is applied between the electrodes 22 and 23.

The input waveguide 3 and the output waveguide 4 are optically coupled to the ring waveguide 21, respectively. In FIG. 4A, the ring waveguide 21 and the input waveguide 3 are optically coupled to each other in an area B1. The ring waveguide 21 and the output waveguide 4 are coupled to each other in an area B2. The optical coupling is realized by forming a very small gap between two optical waveguides.

When two optical waveguides (for example, optical waveguides X1 and X2) are optically coupled to each other, a portion of the light wave which is propagated through the optical waveguide X1 is injected into the optical waveguide X2, and a portion of the light wave which is propagated through the optical waveguide X2 is injected into the optical waveguide X1. Therefore, a portion of the continuous wave light which is propagated through the input waveguide 3 is input to the ring waveguide 21, and a modulated optical signal generated in the ring waveguide 21 is output to the output waveguide 4.

Figure 5:
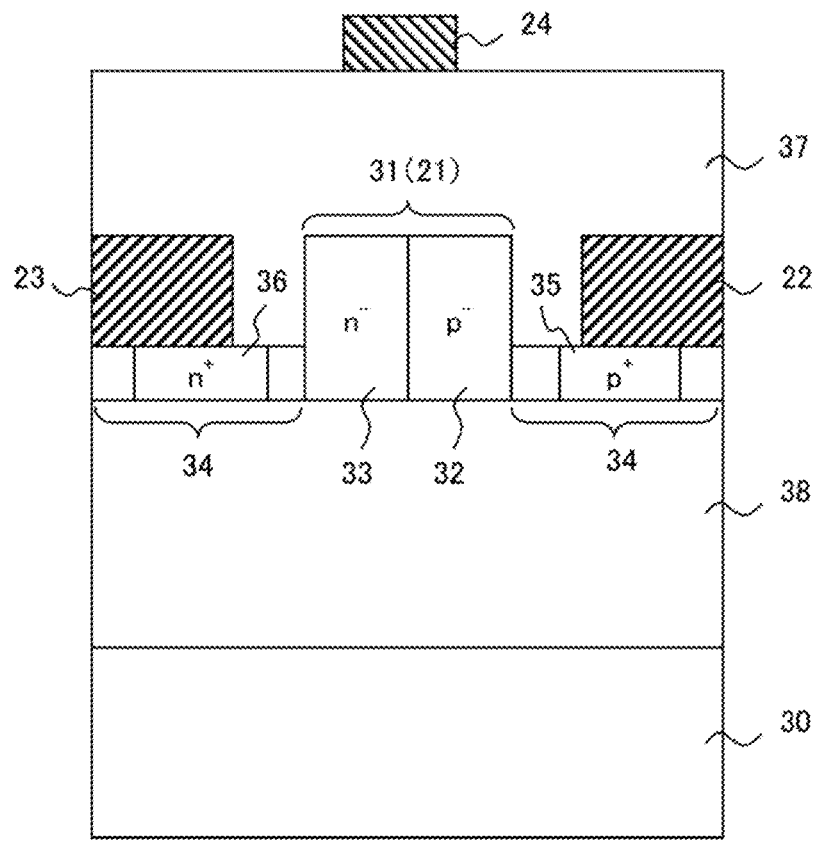
FIG. 5 is a sectional view of the ring resonator-based modulator.

FIG. 5 is a sectional view of the ring resonator-based modulator 2. FIG. 5 illustrates the section A-A' in illustrated in FIG. 4A.

The ring resonator-based modulator 2 is formed on a surface of a substrate 30. In the present embodiment, the ring resonator-based modulator 2 is realized by a rib-waveguide phase shifter with a lateral pn structure. The ring resonator-based modulator 2 includes a waveguide core area 31, a slab area 34, electrodes 22 and 23, and clads 37 and 38. The substrate 30, the waveguide core area 31, and the slab area 34 are realized by, for example, a crystal silicon. The clads 37 and 38 are realized by, for example, $SiO_2$.

The waveguide core area 31 corresponds to the ring waveguide 21 illustrated in FIGS. 4A and 4B, and includes a p-type low concentration doped area 32 and an n-type low concentration doped area 33. That is, the waveguide core area 31 includes a pn junction. A p-type dopant may be boron, and an n-type dopant may be phosphorus. The impurity concentration of the p-type low concentration doped area 32 and the n-type low concentration doped area 33 is, for example, approximately $1 \times 10^{17}$ $cm^{-3}$. The height of the waveguide core area 31 is about 250 nm, and the width is about 500 nm.

The slab area 34 includes a p-type high concentration doped area 35 and an n-type high concentration doped area 36. The p-type high concentration doped area 35 is formed near the p-type low concentration doped area 32, and the n-type high concentration doped area 36 is formed near the n-type low concentration doped area 33. The p-type dopant may be boron, and the n-type dopant may be phosphorus. The impurity concentration of the p-type high concentration doped area 35 and the n-type high concentration doped area 36 is, for example, approximately $1 \times 10^{19}$ $cm^{-3}$. The thickness of the film of the slab area 34 is about 50 nm, and its width is about 3 µm.

The electrodes 22 and 23 are formed in such a way that the waveguide core area 31 is provided between the electrodes 22 and 23. The electrode 22 is formed near the waveguide core area 31, and on the side on which the p-type low concentration doped area 32 is formed. The electrode 23 is formed near the waveguide core area 31, and on the side on which the n-type low concentration doped area 33 is formed. The electrodes 22 and 23 are made of, for example, aluminum.

The clad 37 is formed above the waveguide core area 31, the slab area 34, and the electrodes 22 and 23. The clad 38 is formed below the waveguide core area 31 and the slab area 34. That is, the clads 37 and 38 are formed as enclosing the waveguide core area 31.

A heater electrode 24 is formed above the waveguide core area 31. However, the clad 37 is formed between the heater electrode 24 and the waveguide core area 31. The heater electrode 24 is a resistor for passing the current controlled by the controller 9, and is made of, for example, titan. The heater electrode 24 is formed along the ring waveguide 21 (that is, the waveguide core area 31) as illustrated in FIG. 4B. FIG. 4B illustrates the ring resonator-based modulator 2 viewed from above. However, only the ring waveguide 21 and the heater electrode 24 are illustrated for higher visibility of the figure.

Therefore, by adjusting the current which passes through the heater electrode 24, the temperature of the ring waveguide 21 may be controlled. In the present embodiment, it is assumed that the heater electrode 24 is included in the temperature control unit 8 as illustrated in FIG. 2.

When the ring resonator-based modulator 2 is formed as described above, the input waveguide 3, the output waveguide 4, the light source 5, and the photodetectors 6 and 7 are realized, for example, as follows. The input waveguide 3 and the output waveguide 4 are rib-structure fine line waveguides, and the height of the core area is 250 nm, the width of the core area is 500 nm, and the thickness of the film of the slab area is 50 nm. The gap between the input waveguide 3 and the ring waveguide 21 is 300 nm, and the gap between the output waveguide 4 and the ring waveguide 21 is also 300 nm. The light source 5 is a DFB (distributed-feedback) laser having the oscillation wavelength of 1550 nm, and is formed on an InP substrate. The luminous surface of the light source 5 is optically coupled to a silicon waveguide (the input waveguide 3 in this example). The photodetector 7 may be a pin photodetector having a germanium absorption layer. The photodetector 6 may be a pin photodetector having a InGaAs absorption layer.

In the ring resonator-based modulator 2 with the above-mentioned configuration, an optical signal is propagated through the waveguide core area 31 (that is, the ring waveguide 21). In FIG. 5, the optical signal is propagated through the waveguide core area 31 in the direction orthogonal to the sheet of FIG. 5.

The optical characteristic of the ring waveguide 21 (that is, the waveguide core area 31) depends on the voltage between the electrodes 22 and 23. In the following description, the voltage between the electrodes 22 and 23 may be referred to as an applied voltage to the ring resonator-based modulator 2 or simply as an applied voltage.

For example, the width of a depletion region in the waveguide core area 31 depends on the applied voltage. The depletion region is a low carrier density region. When a reverse bias voltage is applied to the pn junction, the width of the depletion region becomes broader. In the present embodiment, when the applied voltage indicates the L level, the width of the depletion region in the waveguide core area 31 is narrow as illustrated in FIG. 6A. On the other hand, when the applied voltage indicates the H level, the reverse bias voltage is applied to the pn junction of the waveguide core area 31, and the width of the depletion region in the waveguide core area 31 becomes broad as illustrated in FIG. 6B. When the width of the depletion region in the waveguide core area 31 is changed, the optical path length of the waveguide core area 31 (that is, the ring waveguide 21) is changed correspondingly.

Thus, when the applied voltage to the ring resonator-based modulator 2 is changed, the optical characteristic of the ring waveguide 21 is also changed depending on the applied voltage. The applied voltage is changed by the drive signal generated by the signal generator 11. That is, the state of the light propagated through the ring waveguide 21 changes depending on the drive signal. Therefore, a modulated optical signal corresponding to the drive signal is generated in the ring resonator-based modulator 2.

FIG. 7 illustrates the transmittance of the ring resonator-based modulator 2. T(L) and T(H) indicate the transmittances from the light source 5 illustrated in FIG. 2 to the drop port. The transmittance T(L) is the transmittance when the applied voltage indicates the L level. That is, the transmittance T(L) is the transmittance of the ring resonator-based modulator 2 when the drive signal indicates the L level. The transmittance T(H) is the transmittance when the applied voltage indicates the H level. That is, the transmittance T(H) is the transmittance of the ring resonator-based modulator 2 when the drive signal indicates the H level.

The transmittance of the ring resonator-based modulator 2 depends on the wavelength of the optical signal as illustrated in FIG. 7. That is, the transmittance (T(L), T(H)) has a peak with respect to the wavelength. The transmittance curve is rather sharp with respect to the wavelength. In the example illustrated in FIG. 7, the pass band width of the ring resonator-based modulator 2 is about 0.1 nm. Therefore, the ring resonator-based modulator 2 can operate as a wavelength filter.

The transmittance of the ring resonator-based modulator 2 also depends on the applied voltage (that is the voltage between the electrodes 22 and 23) as illustrated in FIG. 7. That is to say, when the applied voltage is changed, the wavelength having the peak transmittance is shifted. In the example illustrated in FIG. 7, the wavelength having the peak in transmittance T(H) is about 0.05 nm longer than the wavelength having the peak in transmittance T(L).

C(L) and C(H) indicate the transmittances from the light source 5 to the through port illustrated in FIG. 2. C(L) is the transmittance to the through port when the applied voltage indicates the L level, and C(H) is the transmittance to the through port when the applied voltage indicates the H level.

As illustrated in FIG. 7, when the transmittances T(L) and T(H) of the ring resonator-based modulator 2 are large, the transmittances C(L) and C(H) are small. That is, at the wavelength having the peak transmittance T(L), the transmittance C(L) has a local minimum or substantially local minimum. Similarly, at the wavelength having the peak transmittance T(H), the transmittance C(H) has a local minimum or substantially local minimum.

Figure 8:
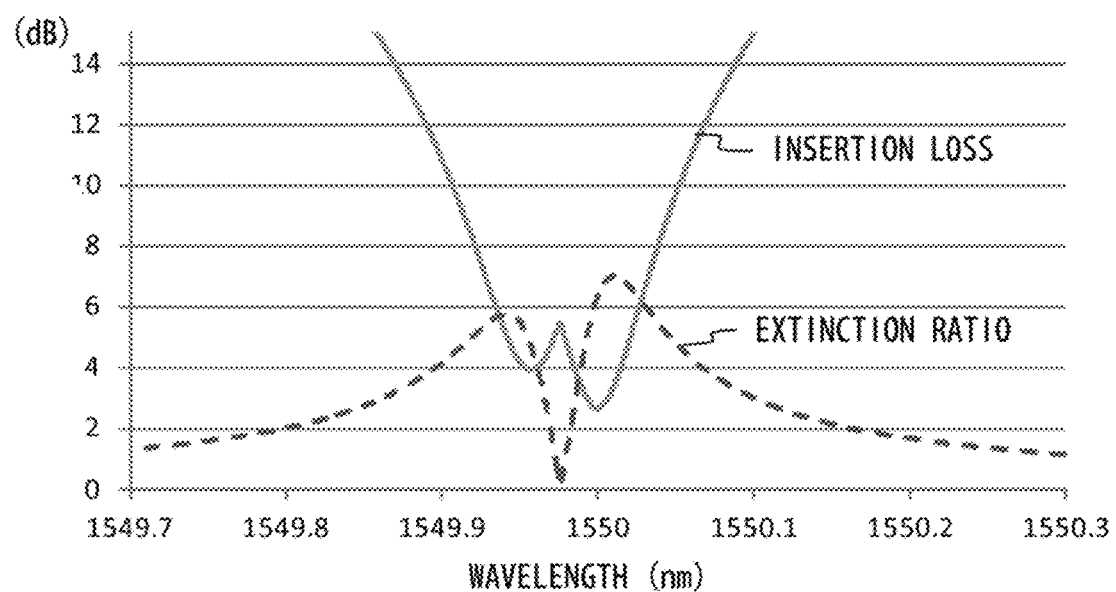
FIG. 8 illustrates the extinction ratio and the insertion loss of the ring resonator-based modulator.

FIG. 8 illustrates the extinction ratio and the insertion loss of the ring resonator-based modulator 2. The extinction ratio is the ratio of the power of the optical signal when the applied voltage indicates the L level to the power of the optical signal when the applied voltage indicates the H level. Therefore, the extinction ratio corresponds to the absolute value of the difference between the transmittance T(L) and the transmittance T(H) illustrated in FIG. 7.

In the present embodiment, the extinction ratio has two peaks with respect to the wavelength. That is, a peak extinction ratio may be obtained at the wavelength (or its vicinity) having a peak of the transmittance T(H), and at the wavelength (or its vicinity) having a peak of the transmittance T(L). However, the maximum extinction ratio is obtained at the wavelength having the peak of the transmittance T(H) in this example.

The insertion loss is caused by the ring resonator-based modulator 2 inserted into the optical path between the light source 5 and the drop port, and corresponds to the reciprocal of the transmittance of the ring resonator-based modulator 2. Note that, in this description, it is assumed that the insertion loss indicates an optical loss when the output optical signal is "1 (luminous state)". In this case, in the wavelength range where the transmittance T(H) is higher than the transmittance T(L), the reciprocal of the transmittance T(H) corresponds to the insertion loss. In the wavelength range where the transmittance T(L) is higher than the transmittance T(H), the reciprocal of the transmittance T(L) corresponds to the insertion loss. In this embodiment, the insertion loss is the minimum at the wavelength (or its vicinity) having the peak of the transmittance T(H).

<Control of Operation State>

It is preferable that the modulated optical signal transmitted from the optical transmitter 1 indicates a high extinction ratio. That is, it is preferable that the optical transmitter 1 generates a modulated optical signal having a high extinction ratio. In addition, in order to efficiently obtain output power with lower power consumption, it is preferable that the insertion loss of the ring resonator-based modulator 2 is small. As illustrated in FIG. 8, the wavelength having the maximum extinction ratio of the modulated optical signal is substantially equal to the wavelength having the minimum insertion loss of the ring resonator-based modulator 2. Therefore, the optical transmitter 1 generates an favorable modulated optical signal by appropriately controlling the operating wavelength (or resonant wavelength) of the ring resonator-based modulator 2.

The operating wavelength of the ring resonator-based modulator 2 is adjusted by changing the optical path length of the ring waveguide 21 illustrated in FIGS. 4A and 4B. The optical path length of the ring waveguide 21 depends on the applied voltage as described above, and also depends on the temperature of the ring waveguide 21. Accordingly, the optical transmitter 1 controls the optical path length of the ring waveguide 21 so that the operation state of the ring resonator-based modulator 2 may be optimized by adjusting the temperature of the ring waveguide 21. For example, it is preferable that the optical path length of the ring waveguide 21 is adjusted so that at least one of the wavelength having the peak transmittance of the ring resonator-based modulator 2, the wavelength having the peak extinction ratio, and the wavelength having the minimum insertion loss matches the peak illustrated in FIG. 3.

Figure 9:
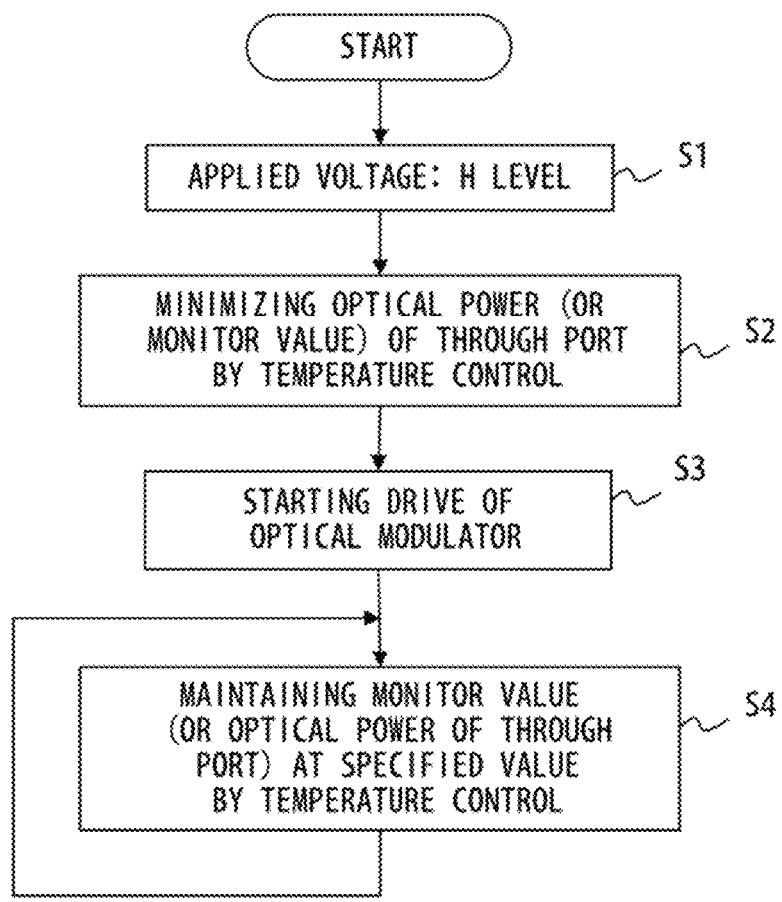
FIG. 9 is a flowchart of the process of controlling the operation state of the ring resonator-based modulator.

FIG. 9 is a flowchart of the process of controlling the operation state of the ring resonator-based modulator 2. The process according to the flowchart is performed, for example, by the controller 9 illustrated in FIG. 2.

In the present embodiment, it is assumed that the operation state of the ring resonator-based modulator 2 is controlled so that the modulated optical signal has the highest extinction ratio, and/or the ring resonator-based modulator 2 has the lowest insertion loss. The operation state in which the modulated optical signal has the highest extinction ratio, and/or the ring resonator-based modulator 2 has the lowest insertion loss is realized at the wavelength having the minimum of the transmittance C(H) to the through port as illustrated in FIGS. 7 and 8. That is, if the transmittance C(H) to the through port is minimized while applying the H level voltage to the ring resonator-based modulator 2, then the operation state in which the modulated optical signal has the highest extinction ratio, and/or the ring resonator-based modulator 2 has the lowest insertion loss is realized. Therefore, the controller 9 performs the following process. It is assumed that the term "to minimize" includes not only "to purely minimize" but also "to substantially minimize" and "to approximately minimize" in the present specification.

In step S1, the controller 9 controls the signal generator 11 to output a voltage of the H level as a drive signal. By so doing, the signal generator 11 continuously applies the voltage of the H level to the ring resonator-based modulator 2. Then, the voltage between the electrodes 22 and 23 indicates the H level, and the width of the depletion region in the waveguide core area 31 becomes broader as illustrated in FIG. 6B.

In step S2, the controller 9 controls the temperature of the ring waveguide 21 to minimize the optical power of the through port. The optical power of the through port is detected by the photodetector 6. The controller 9 controls the temperature of the ring waveguide 21 by adjusting the current supplied to the heater electrode 24.

FIG. 10 is an explanatory view of the control of the temperature in step S2. In FIG. 10, the wavelength λ1 indicates, for example, the wavelength of the laser light corresponding to one of a plurality of oscillation modes of the light source 5 illustrated in FIGS. 3. D1 and D2 schematically indicate the wavelength dependency of the optical power of the through port obtained at the temperatures T1 and T2, respectively.

In this case, if the temperature of the ring waveguide 21 is T1, the power of the laser light of the wavelength λ1 becomes relatively large at the through port. That is, the optical power P1 is obtained in the through port (with respect to wavelength λ1). On the other hand, if the temperature of the ring waveguide 21 is T2, the power of the laser light of the wavelength λ1 becomes the minimum at the through port. That is, the optical power P2 is obtained at the through port. When the optical power at the through port is the minimum, the power of the laser light of the wavelength λ1 becomes the maximum at the drop port, and the extinction ratio of the optical signal also becomes the maximum. Therefore, the controller 9 minimizes the optical power of the through port by adjusting the temperature of the ring waveguide 21 to T2.

Thus, the controller 9 controls the temperature of the ring waveguide 21 so that the optical power of the through port may be minimized. As a result, the ring resonator-based modulator 2 is controlled to be the initial state in which the extinction ratio of the modulated optical signal is the maximum and/or the insertion loss of the ring resonator-based modulator 2 is the minimum.

In step S3, the controller 9 instructs the signal generator 11 to start driving the optical transmitter 1. Upon receipt of the instruction, the signal generator 11 outputs a drive signal corresponding to the data signal transmitted by the optical transmitter 1. The drive signal is supplied to the ring resonator-based modulator 2. Therefore, the ring resonator-based modulator 2 generates a modulated optical signal corresponding to the drive signal.

In step S4, the controller 9 controls the temperature of the ring waveguide 21 to maintain the following monitor value at a constant value.

monitor value=optical power of through port/optical power of light source 5

The optical power of the through port is detected by the photodetector 6. The luminous power of the light source is detected by the photodetector 7. Therefore, the controller 9 may calculate the monitor value using the output of the photodetectors 6 and 7. The controller 9 repeatedly performs the process in step S4 while the optical transmitter 1 is operating.

After the drive of the optical modulator is started in step S3, the drive signal corresponding to the data signal is supplied to the ring resonator-based modulator 2. Therefore, the light guided to the through port includes the component of the data signal. However, since the speed of the photodetector 6 is sufficiently lower than the speed of the data signal, the output of the photodetector 6 indicates an average of the optical power of the through port. Therefore, the optical power of the through port is substantially constant while the ring resonator-based modulator 2 is maintained in a certain state.

Accordingly, the controller 9 may obtain and store the value indicating the optical power of the through port in the state in which the drive signal corresponding to the data signal is supplied to the ring resonator-based modulator 2 immediately after step S2. Here, the operation state of the ring resonator-based modulator 2 is optimized by the control in steps S1 and S2. That is, the value indicating the optical power of the through port that is obtained and stored immediately after step S2 corresponds to the optimum operation state of the ring resonator-based modulator 2. That is, if the control is performed so that the optical power of the through port may maintain the value obtained immediately after step S2, then the operation state of the ring resonator-based modulator 2 is maintained in the optimum state. Therefore, the controller 9 controls the temperature of the ring waveguide 21 so that the optical power of the through port may maintain the obtained value. As a result, the operation state of the ring resonator-based modulator 2 is maintained in the optimum operation state.

However, the characteristic of the light source 5 is changed depending on the temperature and/or aging. Thus, in the present embodiment, the change in characteristic of the light source 5 caused by the temperature and/or aging may be compensated for by using the above-mentioned monitor value. That is to say, by controlling the temperature of the ring waveguide 21 using the monitor value, the extinction ratio of an optical signal and/or the insertion loss of the ring resonator-based modulator 2 may be improved.

The present invention is not limited to the above-mentioned embodiments, but the temperature may be controlled based on the optical power of the through port in step S4. Furthermore, in step S2, the temperature may be controlled based on the monitor value.

As described above, in the optical transmitter 1 of the embodiment, the optical path length of the ring waveguide 21 is controlled to resonate with the wavelength of the input laser light. The ring resonator-based modulator 2 operates as an optical modulator, and also operates as a wavelength filter. Therefore, according to the configuration of the embodiment, the operation state of the optical modulator is optimized by appropriately controlling the optical path length of the ring waveguide 21, and simultaneously the operation state of the wavelength filter is optimized. Therefore, according to the configuration of the embodiment, the operation state of the optical transmitter using a ring resonator may be easily controlled.

In the above-mentioned embodiment, the temperature is controlled so that the optical power of the through port (or the monitor value) may be minimized in step S2, but the present invention is not limited to this method. For example, in FIG. 8, the wavelength at which the extinction ratio of the optical signal is the maximum does not always match the wavelength at which the insertion loss of the ring resonator-based modulator 2 is the minimum. Here, if the optical power of the through port (or the monitor value) is minimized, the operation state in which the insertion loss is minimized is obtained. Therefore, to obtain the operation state in which the extinction ratio of the optical signal is maximized or optimized, a specified offset may be added to the temperature of the ring waveguide 21 after the control of the temperature in step S2.

In the embodiment above, the temperature is controlled in step S2 while the applied voltage is fixed to the H level, but the present invention is not limited to this method. That is, the temperature may be controlled in step S2 while the applied voltage is fixed to the L level. However, when the ring resonator-based modulator 2 has the characteristic illustrated in FIG. 7 (for example, the peak of T(H) is higher than the peak of T(L)), preferable extinction ratio and insertion loss may be realized by controlling the temperature in step S2 while the applied voltage is fixed to the H level.

Furthermore, in the embodiment above, the photodetector 6 for monitoring the modulator is provided at the through port, and the photodetector 7 for monitoring the light source 5 is provided at the rear end of the laser, but the present invention is not limited to this method. That is, the photodetectors 6 and 7 may substantially monitor the output of the optical modulator and the output of the light source 5, respectively. For example, the photodetector 6 may detect the light tapped from the ring waveguide 21. In addition, the photodetector 7 may, for example, detect the light tapped from the optical waveguide on the silicon substrate (for example, the input waveguide 3). However, if the optical loss is taken into account, the configuration illustrated in FIG. 2 is preferable.

<Variation>

In the embodiment above, the material of the core of the waveguide is silicon. However, the material of the core of the waveguide may be any other semiconductor material which is transparent to the light of a communication wavelength band (for example, silicon germanium, InP, GaAs, or a mixed crystal of them, etc.).

In the embodiment above, a Si substrate is used, but any other material (for example, quartz, GaAs, InP, etc.) may form a substrate. However, the Si substrate has advantages such as costing low, easily integrating an electronic circuit such as a driver etc.

The size and others exemplified in the embodiment above are examples only, and the present invention is not limited to them. For example, the width and the height of a waveguide core may be arbitrarily designed within the scope in which a single mode is realized. The width of the slab area may be arbitrarily designed within the scope of not largely changing the spot size. Furthermore, a change may be made to the embodiment above in film thickness of the slab area, the film thickness of the projection, etc.

The doping concentration of the waveguide core area 31 and the slab area 34 is not limited to the embodiment above. However, if the doping concentration is very low, the resistance becomes large, and thus the modulation efficiency is degraded. When the doping concentration is very high, the optical loss becomes large. According to these factors, it is preferable that the doping concentration to the slab area is about $5 \times 10^{18}$ through $5 \times 10^{20}$ cm$^{-3}$. It is preferable that the doping concentration to the waveguide core area 31 is about $5 \times 10^{16}$ through $5 \times 10^{17}$ cm$^{-3}$.

In the embodiment above, the modulation is performed using a change in carrier density by a reverse bias in the rib waveguide structure having a lateral pn structure, but the present invention may use another structure. For example, the modulation may be performed using a change in carrier density by a normal bias in the lateral pin structure. However, it is preferable to use the configuration of the embodiment above to realize a high-speed modulation.

In the embodiment above, a shape of the waveguide of the optical modulator (that is, the ring waveguide ring waveguide 21) is circle, but a shape of it may be racetrack. In this case, linear sections of the waveguide of the optical modulator may be optically coupled with the input waveguide 3 and the output waveguide 4. Note that, when the racetrack waveguide is used, the gap between the waveguides and the line length of the coupling section are determined so that necessary coupling efficiency is obtained.

In the embodiment above, the waveguide is a fine-line rib waveguide, but may be of another structure. For example, a part of the waveguide may be fine-line channel without a slab area. However, since it is difficult to form all waveguides of the optical modulator be channel shaped, the rib waveguide and the channel waveguide may coexist. According to this configuration, there is the possibility that reflection or scatter occurs at the junction between the rib waveguide and the channel waveguide. Otherwise, the height of the core area may be 1 μm or more, and the film thickness of the slab area may be higher than that in the embodiment above. However, according to this structure, the radiation loss increases if the curvature radius of the ring waveguide is reduced in order to downsize the optical modulator.

The light source 5 is not limited to the DFB laser, but may be realized by, for example, laminating a luminous layer on the silicon substrate.

In the embodiment above, the photodetectors 6 and 7 are pin photodetectors having an InGaAs absorption layer or a Ge absorption layer, but the present invention is not limited to this application. That is, the absorption layer of the photodetector may be realized by any other material (for example, InGaAsP etc.) so far as a signal wavelength is absorbed. Furthermore, the photodetector may be an APD or MIN photodetector.

Another Embodiment 1

Figure 11:
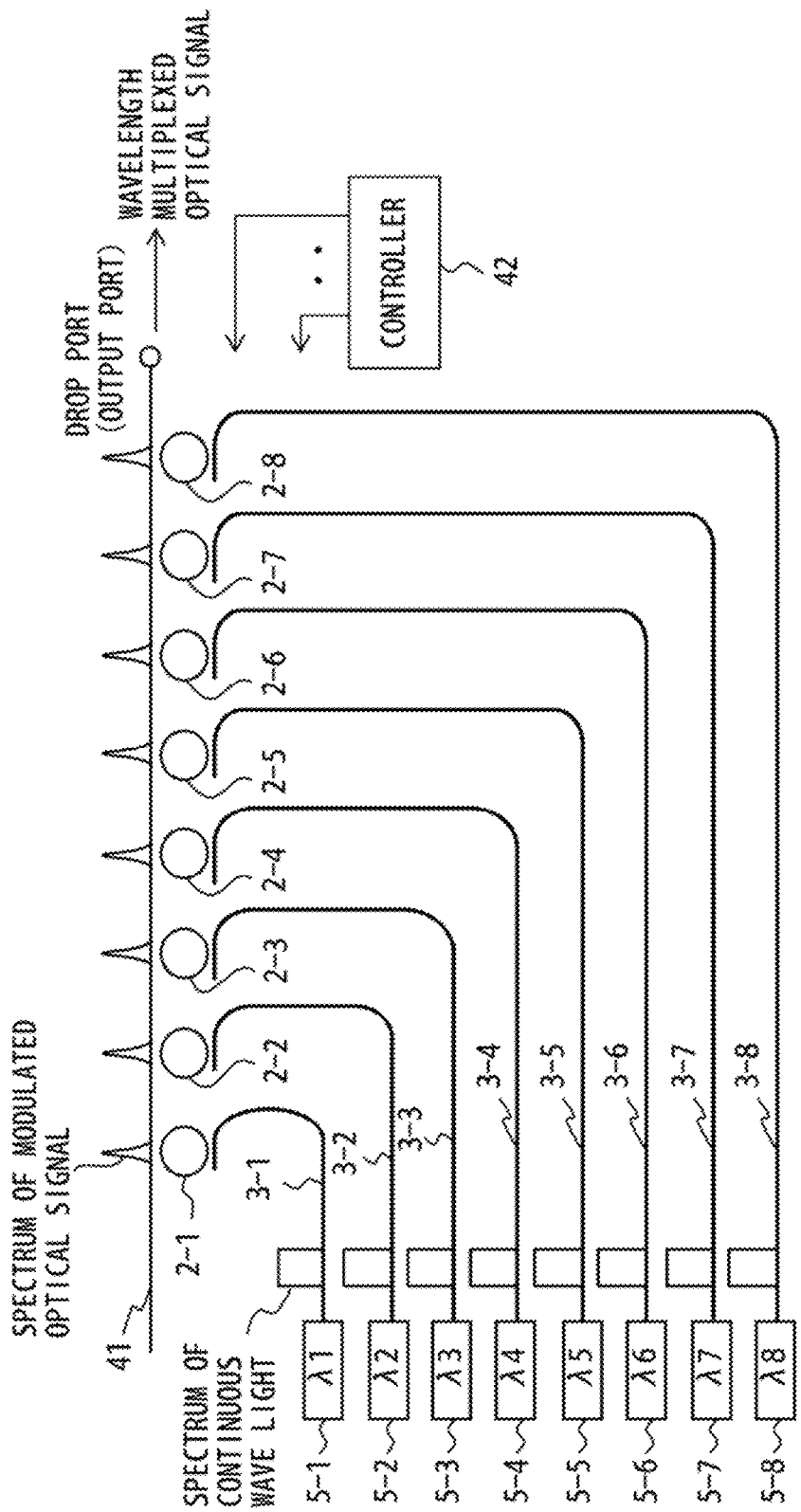
FIG. 11 illustrates an example of the configuration of the wavelength division multiplexing optical transmitter.

FIG. 11 illustrates an example of the configuration of the wavelength division multiplexing (WDM) optical transmitter. A WDM optical transmitter 40 illustrated in FIG. 11 includes ring resonator-based modulators 2-1 through 2-8, input waveguides 3-1 through 3-8, light sources 5-1 through 5-8, and an output bus waveguide 41. Each of the ring resonator-based modulators 2-1 through 2-8 corresponds to the ring resonator-based modulator 2 illustrated in FIG. 2. That is, each of the ring resonator-based modulators 2-1 through 2-8 includes the ring waveguide 21 and the electrodes 22 and 23 illustrated in FIG. 4A. Each of the input waveguides 3-1 through 3-8 corresponds to the input waveguide 3 illustrated in FIG. 2. Each of the light sources 5-1 through 5-8 corresponds to the light source 5 illustrated in FIG. 2.

At the through port of each of the input waveguides 3-1 through 3-8, although not illustrated in FIG. 11, a photodetector corresponding to the photodetector 6 in FIG. 2 is provided. The WDM optical transmitter 40 includes photodetectors for respectively detecting the output power of the light sources 5-1 through 5-8.

The input waveguides 3-1 through 3-8 are optically coupled to the ring waveguide of the ring resonator-based modulators 2-1 through, 2-8 respectively. The ring waveguide of each of the ring resonator-based modulators 2-1 through 2-8 is optically coupled to the output bus waveguide 41.

The light sources 5-1 through 5-8 output laser light of different wavelengths. In FIG. 11, the light sources 5-1 through 5-8 generate the laser light of wavelengths λ1 through λ8, respectively. The laser light of the wavelengths λ1 through λ8 is input to the ring resonator-based modulators 2-1 through 2-8 through the input waveguides 3-1 through 3-8. A drive signal corresponding to the data signal is supplied to each of the ring resonator-based modulators 2-1 through 2-8. Therefore, the ring resonator-based modulators 2-1 through 2-8 generate a modulated optical signal of wavelengths λ1 through λ8, respectively.

The modulated optical signals generated by the ring resonator-based modulators 2-1 through 2-8 are respectively output to the output bus waveguide 41. Therefore, the WDM optical transmitter 40 may output a wavelength multiplexed optical signal including the modulated optical signals generated by the ring resonator-based modulators 2-1 through 2-8. Since the WDM optical transmitter according to the present embodiment does not need a multiplexer for wavelength division multiplexing, the optical transmitter may be downsized and an optical loss may be reduced comparing with a conventional configuration.

In the above-mentioned configuration, the optical path lengths of the ring waveguides of the ring resonator-based modulators 2-1 through 2-8 are designed based on the wavelengths λ1 through λ8, respectively. However, the optical path length of each ring waveguide is controlled by a controller 42. The controller 42 performs the process according to the flowchart illustrated in FIG. 9 on each of the ring resonator-based modulators 2-1 through 2-8.

In the embodiment illustrated in FIG. 11, each of the ring waveguide of the ring resonator-based modulators 2-1 through 2-8 is optically coupled to the output bus waveguide 41, but the present invention is not limited to the configuration. For example, the ring waveguide of each of the ring resonator-based modulators 2-1 through 2-8 may be optically coupled to a corresponding output waveguide, and the optical signal on each output wavelength may be guided to the output bus waveguide 41. However, with the configuration, when it is considered that each output waveguide is a part of the output bus waveguide 41, it can be said that the ring waveguide of each of the ring resonator-based modulators 2-1 through 2-8 is optically coupled to the output bus waveguide 41.

Another Embodiment 2

In the embodiment illustrated in FIG. 2, the optical transmitter 1 includes one ring resonator. However, the present invention is not limited to this configuration. That is, an optical transmitter may be configured to include a plurality of ring resonators.

Figure 12A:
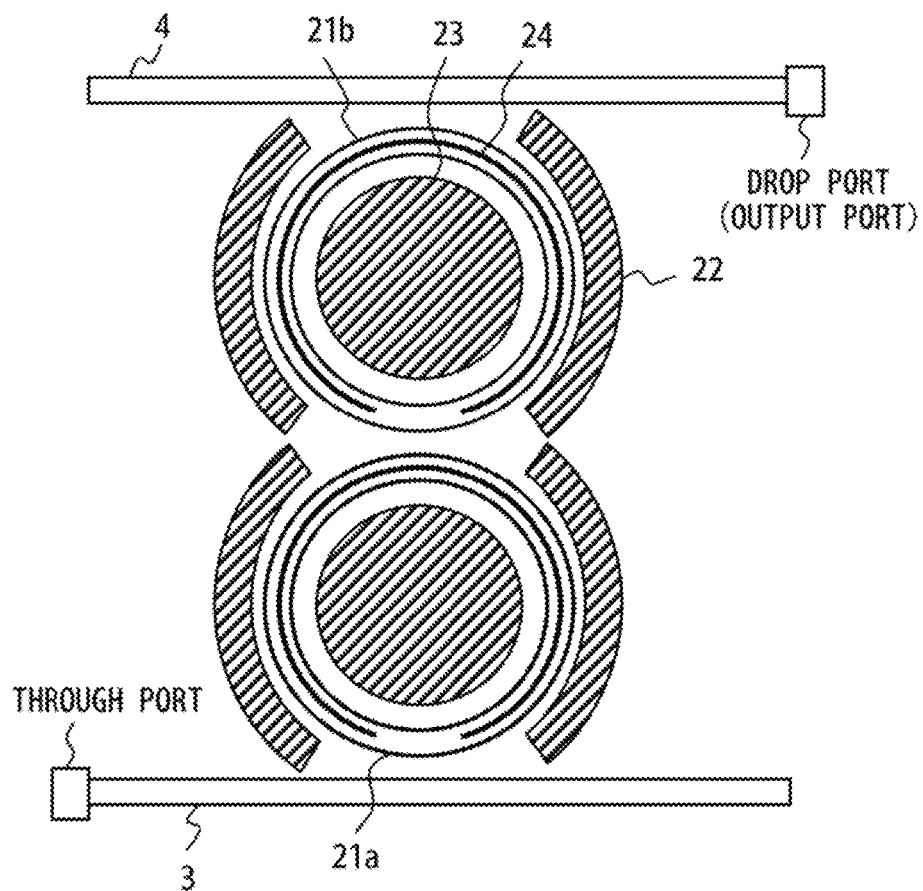
FIGS. 12A and 12B illustrate examples of the configuration of a modulator having a plurality of ring resonators.

FIG. 12A illustrates a configuration of a ring resonator-based modulator having double ring resonators. The ring resonator-based modulator includes optically-coupled ring waveguides 21a and 21b. The shapes of the ring waveguides 21a and 21b are substantially identical to each other. The input waveguide 3 is optically coupled to the ring waveguide 21a, and the output waveguide 4 is optically coupled to the ring waveguide 21b. The electrodes 22 and 23 are formed for each of the ring waveguides 21a and 21b. The heater electrode 24 is formed along each of the ring waveguides 21a and 21b. The controller optimizes the operation state of the ring resonator-based modulator in the procedure according to the flowchart illustrated in FIG. 9. Note that the temperature of the ring waveguides 21a and 21b may be controlled independently.

FIG. 13A illustrates the transmission spectrum of the ring resonator-based modulator illustrated in FIG. 12A. As compared with the embodiment illustrated in FIG. 9 (configuration including one ring resonator), a sharp spectrum is obtained with the configuration including the double ring resonators. That is, since the transmittance changes sharply with respect to the wavelength or the change of the refractive index, thereby increasing the extinction ratio.

Figure 12B:
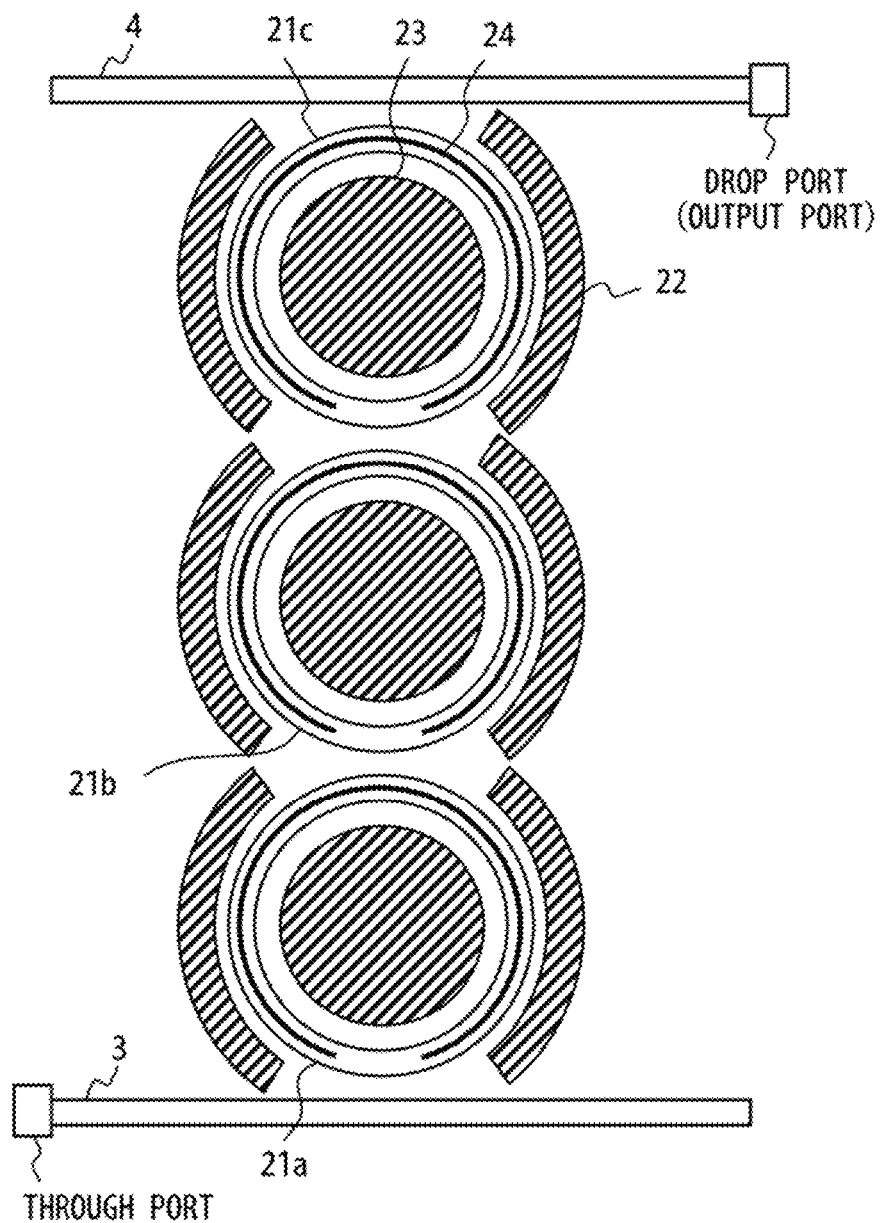

FIG. 12B illustrates a configuration of a ring resonator-based modulator including triple ring resonators. The ring resonator-based modulator includes ring waveguides 21a through 21c that are optically coupled in cascade. That is, the ring waveguide 21a is optically coupled to the ring waveguide 21b, and the ring waveguide 21b is optically coupled to the ring waveguide 21c. The shapes of the ring waveguides 21a through 21c are substantially identical to one another. The input waveguide 3 is optically coupled to the 21a, and the output waveguide 4 is optically coupled to the ring waveguide 21c. The electrodes 22 and 23 are formed for each of the ring waveguides 21a through 21c. The heater electrode 24 is formed along each of the ring waveguides 21a through 21c. The controller optimizes the operation state of the ring resonator-based modulator in the procedure according to the flowchart illustrated in FIG. 9. Note that the temperature of the ring waveguides 21a, 21b and 21c may be controlled independently.

FIG. 13B illustrates the transmission spectrum of the ring resonator-based modulator illustrated in FIG. 12B. As compared with the characteristic illustrated in FIG. 13A, a further sharp spectrum is obtained with the configuration including triple ring resonators, thereby further increasing the extinction ratio. Note that the ring resonator-based modulator may be configured to include four or more ring resonators.

FIG. 14 illustrates the relationship between the extinction ratio and the insertion loss of the ring resonator-based modulator. As illustrated in FIG. 14, when the number of ring waveguides in the ring resonator-based modulator increases, a large extinction ratio is realized. Therefore, when a large extinction ratio is requested, it is preferable to increase the number of ring waveguides. However, in an area where the extinction ratio is small, the smaller the number of ring waveguides, the smaller the insertion loss becomes. Therefore, when a large extinction ratio is not requested, it is preferable that the number of ring waveguides is small to reduce the insertion loss. That is, it is preferable to select the number of ring waveguides depending on the performance (extinction ratio, insertion loss, etc.) requested as an optical transmitter.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical transmitter, comprising:
a ring waveguide;
an electrode which is formed near the ring waveguide and is provided with a signal;
a first waveguide optically coupled to the ring waveguide;

a second waveguide optically coupled to the ring waveguide without being optically coupled directly to the first waveguide; and a light source configured to supply continuous wave light to the first waveguide, wherein a modulated optical signal that is generated in the ring waveguide based on the signal provided to the electrode is outputted through the second waveguide.

2. The optical transmitter according to claim 1, further comprising a temperature control unit configured to change a temperature of the ring waveguide.

3. The optical transmitter according to claim 2, wherein the temperature control unit includes:

a resistor formed near the ring waveguide; and a controller configured to control a current to be supplied to the resistor.

4. The optical transmitter according to claim 3, wherein the first waveguide has a first end and a second end, continuous wave light generated by the light source is input from the first end to the first waveguide, the optical transmitter further includes a first photodetector configured to detect light output from the second end of the first waveguide, and the controller controls the current supplied to the resistor based on an optical level detected by the first photodetector.

5. The optical transmitter according to claim 4, further comprising a second photodetector configured to detect output level of the light source, wherein the controller controls the current supplied to the resistor based on the optical level detected by the first photodetector and the output level detected by the second photodetector.

6. The optical transmitter according to claim 1, wherein a core area of the ring waveguide includes p-type semiconductor and n-type semiconductor to form pn junction.

7. An optical transmitter, comprising:

a plurality of ring waveguides optically coupled in cascade;

an electrode which is formed near the ring waveguides and is provided with a signal;

a first waveguide optically coupled to one of the ring waveguides located at one end of the ring waveguides;

a second waveguide optically coupled to another of the ring waveguides located at the other end of the ring waveguides without optically being coupled directly to the first waveguide; and a light source configured to supply continuous wave light to the first waveguide, wherein a modulated optical signal that is generated in the ring waveguides based on the signal provided to the electrode is outputted through the second waveguide.

8. An optical transmitter including a plurality of ring resonator-based transmitters and a bus waveguide, wherein:

each ring resonator-based transmitter comprises:

a ring waveguide;

an electrode which is formed near the ring waveguide and is provided with a signal;

an input waveguide which is optically coupled to the ring waveguide; and a light source configured to supply continuous wave light to the input waveguide;

wavelengths of continuous wave light generated by the light sources of respective ring resonator-based transmitters are different from one another, and the ring waveguides of respective ring resonator-based transmitters are optically coupled to the bus waveguide, wherein modulated optical signals that are respectively generated in the ring waveguides based on the signals provided to the electrodes are outputted through the bus waveguide.

9. An optical modulator, comprising:

a ring waveguide;

an electrode which is formed near the ring waveguide and is provided with a signal;

a first waveguide which is optically coupled to the ring waveguide, continuous wave light being input to the first waveguide; and a second waveguide which is optically coupled to the ring waveguide without being optically coupled directly to the first waveguide, wherein a modulated optical signal that is generated in the ring waveguide based on the signal provided to the electrode is outputted through the second waveguide.

10. A method for controlling an optical transmitter that includes a ring waveguide, an electrode formed near the ring waveguide, a first waveguide optically coupled to the ring waveguide, a second waveguide optically coupled to the ring waveguide without being optically coupled directly to the first waveguide, and a light source which supplies continuous wave light to the first waveguide from a first end of the first waveguide, the method comprising:

monitoring an optical level at a second end of the first waveguide while applying a specified voltage to the electrode;

controlling the temperature of the ring waveguide such that the monitored optical level is smaller; and generating a modulated optical signal in the ring waveguide by supplying a signal to the electrode to output the modulated optical signal through the second waveguide after the monitored optical level is minimized in the controlling process.

11. The method according to claim 10, wherein the temperature of the ring waveguide is controlled so that a ratio of an optical level detected at the second end of the first waveguide to an output level of the light source is constant when the optical transmitter generates a modulated optical signal according to a signal applied to the electrode.

* * * * *